Patented Nov. 10, 1931

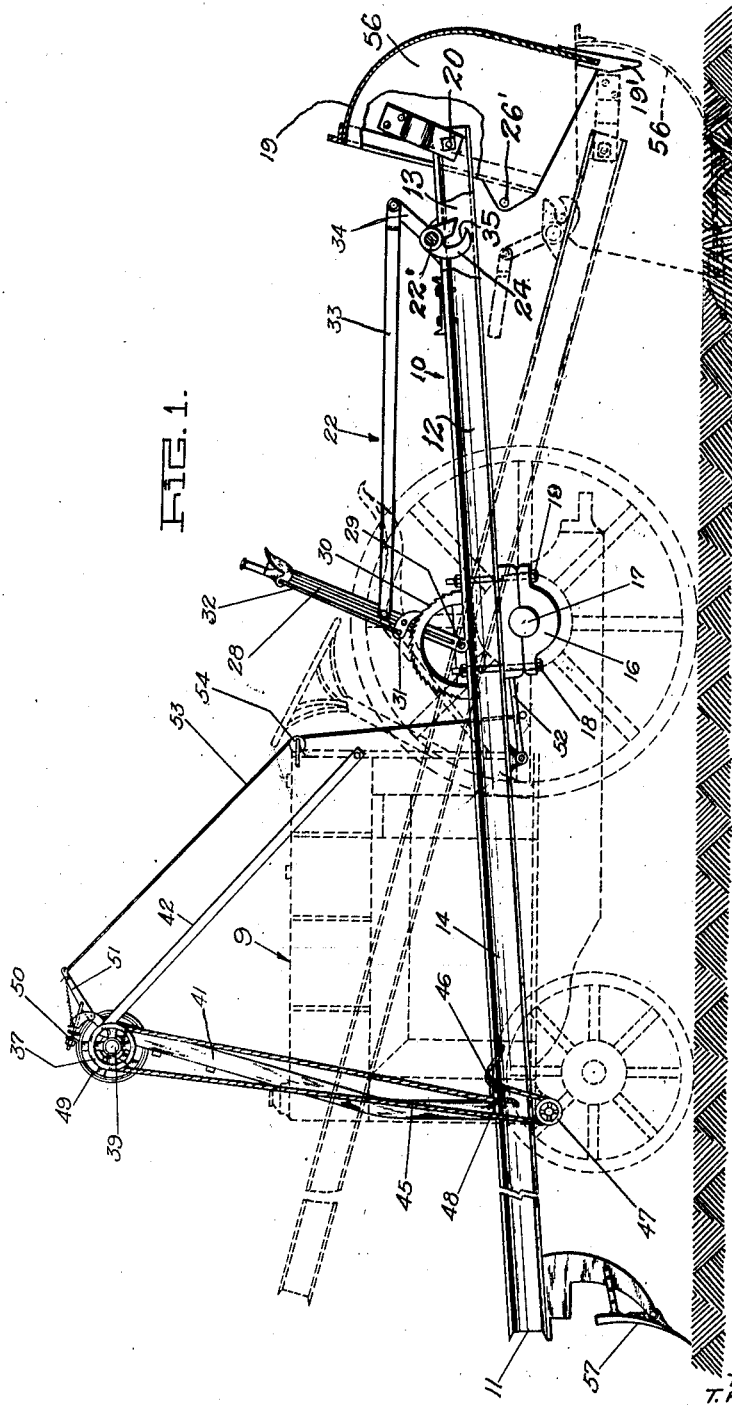

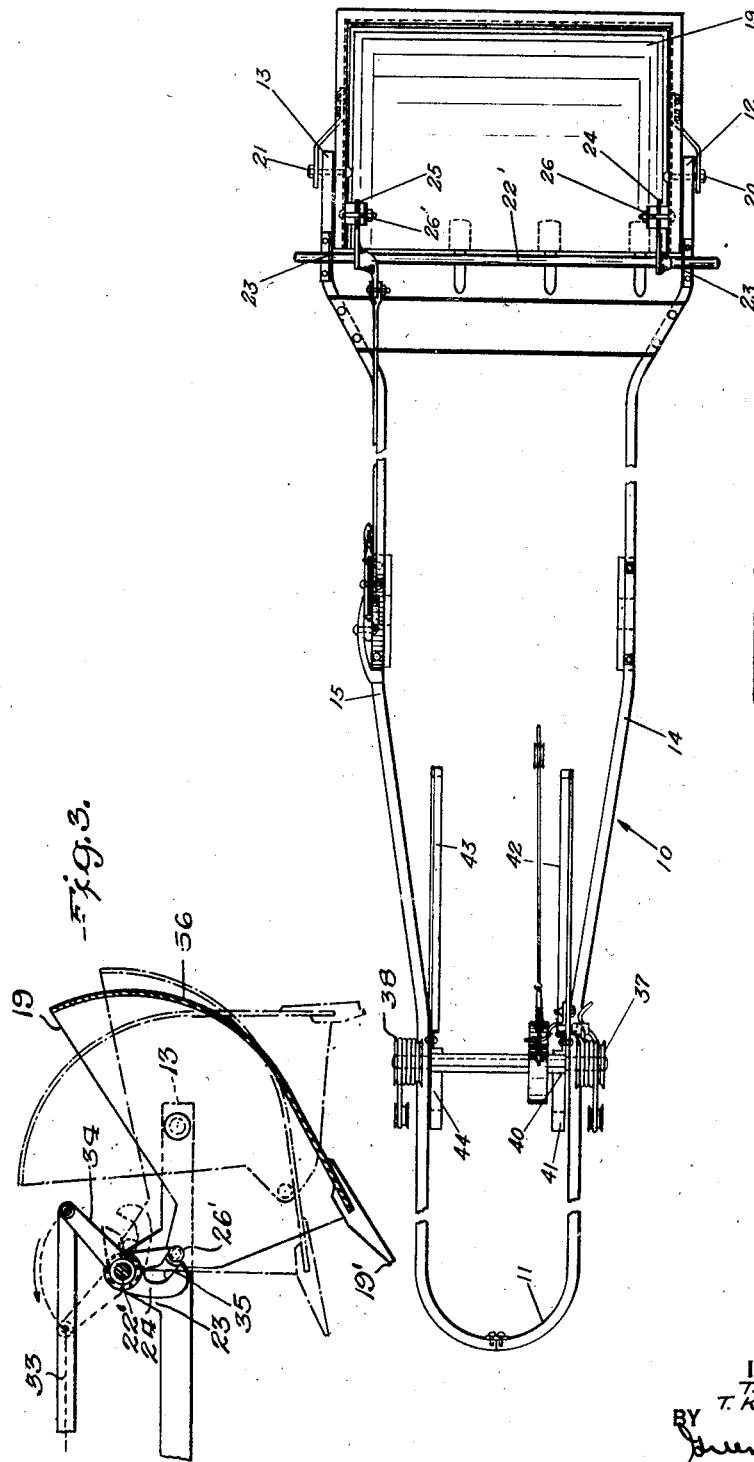

1,831,222

UNITED STATES PATENT OFFICE

TENGEL ANDERSEN AND THOMAS K. ANDERSEN, OF PORT RICHMOND, NEW YORK, ASSIGNORS TO ANDERSEN-EADIE MANUFACTURING CORPORATION, A CORPORATION OF NEW YORK

ATTACHMENT FOR TRACTORS

Application filed November 8, 1927, Serial No. 231,833. Renewed September 23, 1931.

The present invention relates to an attachment for heavy duty vehicles such as tractors or the like and relates more particularly to an excavating implement for use in connection with such a vehicle.

The use of tractors in connection with road work, excavations, farming, etc., is well known and many devices have been proposed for use in connection therewith, and one of the most important uses for a tractor is to operate a scoop or shovel which will gouge into the ground and by reason of its movement with the tractor, become filled with earth, stones etc., to be carried away.

Under conditions where the ground is soft or loose no difficulty arises and there are many ways of constructing a tractor operated scoop or shovel.

If, however, a tractor scoop is to answer all requirements, it must be operable for the removal of earth resistant to penetration by the usual implements and must be capable of dislodging and removing comparatively large stones or rocks.

An object of the present invention is, therefore, to provide a shovel attachment of such arrangement and construction as to utilize the full power of the tractor or other motive force to which it is harnessed.

Another object of the invention is to provide a tractor with an earth removing attachment which may be easily handled and of simple construction.

Another object of the invention is to provide a digging implement so arranged as to utilize the full weight and power of a tractor to effect an efficient digging operation.

Other objects and advantages will be apparent as the description proceeds.

In carrying out the present invention, a tractor as, for example, one of the Fordson type, is provided with a U-shaped lever-member in the form of a yoke. The closed end of the yoke being disposed in front and extended from the tractor. The opposite ends of the said member may extend from the rear of the tractor and serve to carry a bucket which in the present embodiment of the invention is in the form of a shovel or scoop and is hinged to the ends of the yoke. The yoke is pivotally held on a split collar which may be attached to the bearings of the rear axle of the tractor, thus permitting the scoop to be raised or lowered. For the purpose of holding lever-member and consequently the scoop in a desired fixed position, means in the form of a pair of drums and cables are provided. Each cable passes over a drum, one cable being secured to the yoke directly from the drum while the other end of the cable passes around an idler pulley and thence to the yoke to which it is fastened. The drums are supported above the yoke while the pulleys are below, thus a free rotary movement of the drums will permit a movement of the yoke about its pivot and an adjustment in the position of the scoop may readily be obtained. A brake is, however, provided so that the drums may be held from rotation and the scoop or bucket held in an operative or inoperative position. Means are also provided for holding the bucket or scoop in a given relative position with respect to the U-shaped member.

The invention will be more fully understood by reference to the accompanying drawings in which:

Fig. 1 is an elevational view of an embodiment of the present attachment as applied to a tractor;

Fig. 2 is a plan view of the attachment shown in Fig. 1 and

Fig. 3 is an enlarged detail view showing the scoop in different positions with means for holding in relation to a lever arm.

Although applicable to various types of tractors, the invention as illustrated is attached to a tractor 9 of the Fordson type and may comprise a yoke or U-shaped lever-member 10 having its closed end 11 extending about the front end of the tractor and ends 12 and 13 of arms 14 and 15 of the yoke projecting from the rear end of the tractor.

The yoke 10 is pivotally supported at a point substantially one third the over-all length of each of the arms 14 and 15. For this purpose, a split collar 16 is provided which may be positioned about the rear axle 17 of the tractor 9 indicated in dotted lines, and bolts 18 may be employed to secure the lever-member 10 to the split-collar 16 which is free to rock about the axle. It is understood that a collar is provided on each member of the yoke and at opposite sides of the tractor. The split-collar shown is only an example of one mode of fastening the member 10 to the tractor and any suitable form of connection may be provided.

Since the collar 16 is so fitted as to be rotatable, a pivoted support is furnished for the yoke 10 the ends 12 and 13 of which have a scoop or bucket 19 pivotally connected thereto at 20 and 21. The pivot points are so positioned on the bucket that when the bucket is empty and clear of the ground it will swing into an operating position, that is, with the tines or digging teeth in position to engage with and scoop up earth or other material.

For the purpose of holding the scoop 19 in position to dig into the ground, means in the form of latch device 22 is provided. This device may comprise a trunnion or shaft 22' journaled in oppositely disposed bearings 23 on the members 12 and 13 of the yoke 10. The shaft 22' is provided with a pair of cam-latch members 24 and 25 engageable with latch-bars 26 and 26' secured to opposite edges of an upper edge of the bucket 19. The cam-latch members are actuated through the agency of a clutch lever 28 pivoted at 29 on member 10 and provided with the usual toothed segment 30 and a spring operated pawl 31 actuated by a grip-rod 32. Connection between the clutch lever 28 and the cam-latch members may comprise a link 33 having one end pivotally connected to the lever 28 and the other end pivotally connected to an arm 34 integral with and extending upwardly from one of the cam-members as, for example, the member 24. These cam-latch members are so constructed that surfaces 35 thereof may receive the rod latch-bars of the bucket and thereby hold the bucket in its operative position. The cam-latch members may be termed bucket holding means since the cam retains the bucket in position with relation to the lever member 10.

By adjusting the position of the cam-latch members through a manipulation of the clutch lever 28 the positions of the latch-bars on the surfaces 35 of the cam-members may be varied, thus a variation in the degree of the angle of thrust may be attained for the digging edge or blade 19' of the bucket. This edge may be in the form of teeth as shown or a continuous surface or any suitable construction to constitute a digging implement.

Since the yoke 10 is normally free to oscillate, means are provided to retain it in a fixed position which means may comprise a pair of drums 37 and 38 rotatable with a shaft 39 supported in a bearing 40 secured to support members 41, 42 and 43, 44. The support members may be suitably secured to the frame work of the tractor.

The drum 37 is provided with a cable 45, one end 46 of which is secured to arm 14 of the lever-member 10, and thence over an idler pulley 47 secured to support 41. The drum 38 is provided with a cable and connections similar to the cable 45 and its connections. The cable is then led over drum 37 in a bight and back to the arm 14 where the opposite end of the cable is secured at 48. The drum 38 is provided with a cable which is rigged in the same manner as cable 45. It will then be evident that the lever-member 10 may freely rock about its pivot as long as the drums 37 and 38 are free to rotate. For the purpose of holding the member 10 in any given position, the shaft 39 is provided with braking means comprising a wheel 49 having a brake-band 50 operable by pull on an arm 51 to frictionally engage the wheel 49 and terminate a rotation of the drums 37 and 38. The above described means for holding the lever member 10 in a given position may be termed lever member retaining means.

The arm 51 may be actuated by means of a foot treadle 52 in convenient position for the driver of the tractor. The treadle may be connected to the arm by a suitable chain or cord 53 passing over a guide sheave 54.

By reason of the foot controlled means to arrest movement of the lever-member 10, the bucket 19 may be held in an elevated position as just after dumping a load of material.

When the bucket is in an operative position, the digging edge is directed at an angle to the ground and by reason of the weight of the bucket will tend to bear into the ground. When the tractor is started, the cutting or digging edge of the bucket will enter the ground as shown in dotted lines in Fig. 1. This obviously causes a great stress on the working parts since the digging edge must move irrespective of the hardness of the ground or opposing substances as rocks, etc. Owing to the present construction, it has been found in practice that the present bucket may be used to remove extremely refractory ground and will displace large rocks utilizing the full traction power of the tractor. As will be noted, the tendency of the bucket when working is to exert a force which would act to lift the tractor, particularly when the edge of the bucket strikes a rock, the tendency is to lift the bucket which action is opposed by the heaviest end of the tractor. In addition, a component of the applied force is transferred to the opposite end of the tractor in a downward direction by reason of the lever-member 10 through the cables 45.

When the bucket has been moved a sufficient distance to fill with earth, the movement of the tractor is reversed and the cam-latches 24 and 25 released. This causes the bucket, by reason of its rounded surface 56, to tip the digging edge upwardly out of engagement with the ground. When the digging edge is tilted upwardly and the bucket rests on its rounded surface the load may be hauled since the surface 56 readily slides along the ground. The surface 56 although functioning to cause the digging edge to tilt may be termed the hauling surface. After the load has been hauled to position for dumping the treadle 52 may be actuated to release the lever member 10 and the lever 28 may be actuated to release the bucket to permit it to move about its pivot. The tractor may then be again advanced and the teeth of the bucket engage the ground. Since the bucket is loose or free to turn a continued movement of the tractor will cause the bucket to empty its load of earth in a mound and as the bucket is drawn over the deposited earth it is lifted to position as shown in Fig. 1.

The center of gravity of the bucket is such, however, that it swings the latch-bars 26 and 26' into engagement with the cam-levers 24 and 25 whereupon the clutch is set to hold the bucket in the desired operating position. The weight of the bucket causes it to lower and when the edge thereof is in contact with the ground, the operator actuates the foot treadle 52 to lock the drums 37 and 38, thereby holding the bucket for the digging operation. In addition to the bucket, the member 10 may be provided with a ground scraper 57.

Although a preferred embodiment of the invention is shown and described herein, it is to be understood that modifications may be made therein without departing from the spirit and scope of the invention as set forth in the appended claims.

What is claimed is:

1. In combination with a tractor or the like a lever member pivotally attached to the tractor, said lever member having a rearwardly extending arm and a forwardly extending arm, a pivoted scoop having a cutting edge upon said rearwardly extending arm, means for holding said scoop in a given position relative to said arm, means connected with said forwardly extending arm for holding the scoop in position to collect material upon a movement of the tractor, said first mentioned means being operable to release said scoop whereby a continued movement of said tractor causes the scoop to pivot about its cutting edge to discharge collected material in advance of its movement.

2. In combination with a tractor or the like a lever member pivotally attached to the tractor, said lever member having a rearwardly extending arm and a forwardly extending arm, retaining means to hold said lever member in a given position, a pivoted scoop having a cutting edge upon said rearwardly extending arm, means for holding and locking said scoop in a given position with respect to said arm, said retaining means operating to hold the scoop in position to collect material upon a movement of the tractor, said second mentioned means being operable to release said scoop whereby a continued movement of said tractor causes the scoop to pivot about its cutting edge to discharge collected material in advance of its movement and means for releasing said first mentioned means whereby an upward movement of the scoop is caused by reason of its engagement with the discharged material.

3. In combination with a tractor or the like, a lever member pivotally attached to the tractor, a scoop having a digging edge mounted on one end of said member, said scoop being of sufficient weight to normally over-balance said member and engage the surface over which the tractor moves, retainer means at the other end of said lever member for holding the scoop in position during operation to collect material, said scoop being rockable for the discharge of said material in advance of its movement with the tractor so that a continued movement of the tractor will cause the scoop to engage the discharged material and be lifted, said retainer means being operable to hold the scoop in its lifted position.

4. In combination with a tractor or the like, a lever member pivotally attached to the tractor, a scoop having a digging edge at one end of said member for collecting material from the surface over which the tractor moves, means for locking said scoop in a given position relative to said member, retainer means for said member to hold the scoop in position during the collection of material from said surface, means for actuating said locking means to permit the scoop to discharge material in advance of the movement of said scoop, means for actuating said retainer means for releasing said member so that upon a continued movement of the tractor as the scoop engages the discharged material it will be elevated preparatory to adjustment for another digging operation.

5. In combination with a tractor or the like, a lever member pivotally attached to the tractor, a scoop having a digging edge at one end of said member for collecting material from the surface over which the tractor moves, holding means for maintaining said scoop in a given position with relation to said member, retainer means for said member to hold said member and the scoop in a given position during the collection of material from said surface, means for actuating said holding means to release said scoop for the discharge of said material in advance of the movement of said scoop, said first mentioned means being operable to release said member so that upon a continued movement of the tractor the scoop will engage the discharged material and be elevated preparatory to adjustment for another digging operation, said holding means being operable to retain said scoop in different positions to vary the depth of cut effected by the digging edge.

6. In combination with a tractor or the like, an arm pivoted for movement in a vertical plane, a scoop supported at one end of said arm, a cutting edge on said scoop, a rounded surface on said scoop, means for controlling the position of said arm to hold said scoop with the cutting edge in a digging position during a forward movement of said tractor and means for releasing said holding means to permit the scoop to rock on its rounded surface during a reverse movement of said tractor to render the digging edge inoperative.

7. In combination with a tractor or the like, an arm pivotally attached to said tractor, a scoop supported on said arm, a cutting edge on said scoop, a rounded surface on said scoop, means for securing said arm and scoop in a given elevated position, means for locking said scoop with the cutting edge in a digging position during a forward movement of said tractor, means for releasing said locking means to permit the scoop to rock on its rounded surface during a reverse movement of said tractor to render the digging edge inoperative, said locking means being operable to relock the scoop with its digging edge inoperative.

8. In combination with a tractor or the like, an arm pivotally attached to said tractor, retainer means for locking said arm in a given position, a scoop pivotally supported at one end of said arm, a cutting edge on said scoop, a rounded surface on said scoop, means for holding said scoop in a given position relative to said arm with the cutting edge in a digging position during a forward movement of said tractor, means for releasing said holding means to permit the scoop to rock on its rounded surface during a reverse movement of said tractor to render the digging edge inoperative and attain a hauling position, said first mentioned means being operable to lock the scoop with its digging edge in hauling position and for releasing said scoop to permit a movement of the tractor to rock the scoop to engage the digging edge with the ground and cause the scoop to pivot about said edge said retainer means being releasable to permit a movement of said arm when the scoop rocks about its digger edge to discharge collected material.

9. In combination with a tractor or the like, a lever member pivotally attached to said tractor, a scoop pivotally mounted at one end of said lever member, said scoop having a digging edge to collect material upon a forward movement of said tractor and a rounded surface on said scoop for engaging the ground to rock the scoop on its pivot upon a reverse movement of the tractor to raise the digging edge and means for holding the scoop with its digging edge raised to prevent the collection of material upon a forward movement of the tractor.

10. In combination with a tractor or the like, a lever member pivotally attached to said tractor, a scoop pivotally mounted at one end of said lever member, said scoop having a digging edge to collect material upon a forward movement of said tractor and a rounded surface on said scoop for engaging the ground to rock the scoop on its pivot upon a reverse movement of the tractor to raise the digging edge, means for holding the scoop with its digging edge raised to prevent the collection of material upon a forward movement of the tractor, said last mentioned means being operable to lock the scoop with the cutting edge in said digging position.

11. In combination with a tractor or the like a lever member pivotally attached to the tractor, said lever member having a rearwardly extending arm and a forwardly extending arm, a scoop having a cutting edge pivotally mounted upon said rearwardly extending arm, means for holding said scoop in a given position relative to said arm, means connected with said forwardly extending arm for holding the scoop in position to collect material upon a movement of the tractor, means for releasing said first mentioned means whereby a continued movement of said tractor causes the scoop to pivot about its cutting edge to discharge collected material in the path of its movement.

12. In combination with a power tractor or the like, a rocker member on said tractor, said rocker member having a forward and a rear arm, a scoop having a digging edge pivotally mounted on the rear arm, said scoop having a rounded surface, and having sufficient weight to over-balance the forward arm and normally rest upon the ground, means for locking said scoop with its digging edge in position to collect earth from the ground during a forward movement of said tractor, means for retaining said rocker member relatively immovable during a digging operation, said locking means being releasable to permit a reverse movement of the tractor to rock the scoop about its rounded surface and tilt the digging edge to an inoperative position.

13. In combination a power tractor or the like, a rocker member on said tractor, said rocker member having a forward and a rear arm, a scoop having a digging edge pivotally mounted on the rear arm, said scoop having a rounded surface, and having sufficient weight to over-balance the forward arm and normally rest upon the ground, means for locking said scoop with its digging edge in position to collect earth from the ground during a forward movement of said tractor, means for retaining said rocker member relatively immovable during a digging operation, said locking means being releasable to permit a reverse movement of the tractor to rock the scoop about its rounded surface and tilt the digging edge to an inoperative position, said first named means being operable to lock the scoop with its digging edge tilted to haul the collected material.

14. In combination a power tractor or the like, a rocker member on said tractor, said rocker member having a forward and a rear arm, a scoop having a digging edge pivotally mounted on the rear arm, said scoop having a rounded surface, and having sufficient weight to over-balance the forward arm and normally rest upon the ground, means for holding said scoop with its digging edge in position to collect earth from the ground during a forward movement of said tractor, means for retaining said rocker member relatively immovable during a digging operation, said holding means being releasable to permit a reverse movement of the tractor to rock the scoop about its rounded surface and tilt the digging edge to an inoperative position, said means for holding the scoop being operable to hold the scoop in an inoperative position for hauling and releasable to permit a movement of the tractor to rock the scoop about its pivot and engage the said digging edge in the ground to discharge the collected material.

15. In combination a power tractor or the like, a rocker member on said tractor, said rocker member having a forward and a rear arm, a scoop having a digging edge pivotally mounted on the rear arm, said scoop having a rounded surface, and having sufficient weight to over-balance the forward arm and normally rest upon the ground, means for locking said scoop with its digging edge in position to collect earth from the ground during a forward movement of said tractor, retainer means for said rocker member to hold the same relatively immovable during a digging operation, said locking means being releasable to permit a reverse movement of the tractor to rock the scoop about its rounded surface and tilt the digging edge to an inoperative position, said locking means being operable to retain the scoop in said inoperative position while the scoop is hauled and releasable to permit a forward movement to rock the scoop about its pivot and engage the cutting edge of the same in the ground to discharge the collected material in its path of movement, means for actuating said retainer means to release said rocker member to cause the scoop to be lifted when moved over the discharged material.

16. In combination a power tractor or the like, a rocker member on said tractor, a scoop having a digging edge pivotally mounted on said member, said scoop having a rounded surface, means for locking said scoop in a given position relative to said member and with its digging edge in position to collect earth from the ground during a forward movement of said tractor, retainer means for holding said rocker member relatively immovable during a digging operation, means for releasing said locking means to permit a reverse movement of the tractor to rock the scoop about its rounded surface and tilt the digging edge to an inoperative position, said locking means being operable to relock the scoop with its digging edge inoperative.

17. In combination a power tractor or the like, a rocker member on said tractor, said rocker member having a forward and a rear arm, a scoop having a digging edge pivotally mounted on the rear arm, said scoop having a rounded surface, and having sufficient weight to over-balance the forward arm and normally rest upon the ground, means for locking said scoop with its digging edge in position to collect earth from the ground during a forward movement of said tractor, retainer means for holding the rocker member relatively immovable during a digging operation, said locking means being releasable to permit a reverse movement of the tractor to rock the scoop about its rounded surface and tilt the digging edge to an inoperative position, said locking means being operable to relock the scoop for a hauling operation and to release the scoop to cause the digging edge to engage the ground and discharge collected material, said retainer means being releasable to permit the scoop to be elevated when passing over the discharged material upon a forward movement of the tractor, said scoop having its pivot point so located as to automatically take a digging position with respect to the rocker arm when free from the mound of discharged material, said locking means being operable to again lock the scoop in digging position.

18. In combination a power tractor or the like having a support member, a rocker member on said tractor and having a pivot point intermediate its ends to provide a forward arm and a rear arm, a scoop having a digging edge attached to the rear arm, a flexible connection between said forward arm and said support member and means for holding said rocker in adjusted positions to hold the rear arm in different positions to vary the position of the scoop.

19. An attachment for a tractor comprising a lever member, means intermediate the ends of said member for pivotally mounting said member on a power vehicle, a digging and collecting implement pivotally mounted at one end of said member, means for locking said implement in digging position on said member, means for retaining said member relatively immovable with respect to said vehicle during a digging operation, said last mentioned means being operable to release said member, and means for actuating said first mentioned means to permit the discharge of collected material.

20. In combination with a tractor, a ground removing attachment comprising a rockable arm pivoted at one end of the tractor, a digging edge at one end of said arm, and means at the other end of said arm for holding said edge in position to enter the ground upon a forward movement of the tractor, said attachment being so positioned whereby the greater portion of force required to cause the edge to enter the ground is opposed by the weight of the heaviest portion of the tractor.

21. In combination with a tractor, a ground removing attachment comprising a lever arm pivoted at one end of the tractor, a digging edge at one end of said arm, and means for holding said arm in position to cause said digging edge to enter the ground upon a forward movement of the tractor, said attachment being so positioned whereby the greater portion of force required to cause the edge to enter the ground is opposed by the weight of the heaviest portion of the tractor and the remaining portion of said force is opposed by other portions of the tractor.

22. In combination with a tractor or the like, a lever member pivotally attached to the tractor, a digging implement at one end of said member, a drum supported above the edge at one end of said arm, and means for holding said member in an adjusted position including a cable connecting said last mentioned end with said drum.

23. In combination with a tractor or the like, a lever member pivotally attached to the tractor, a scoop at one end of said member, a drum supported above the opposite end of said member, means for holding said member in an adjusted position including a cable connecting said last mentioned end with said drum and means for holding said scoop in an adjusted position with respect to said member.

24. In combination with a tractor or the like, a lever member pivotally attached to the tractor, a digging implement at the rear end of said member and manually operable means associated with the opposite end of said member for holding said member with the digging implement in a given position.

25. In combination with a tractor or the like a lever member having a forwardly and a rearwardly extending arm, a scoop on the rear arm, manually operable means for holding said lever with the scoop in a given position and means for adjusting the position of the scoop relative to said member.

In testimony whereof we affix our signatures.

TENGEL ANDERSEN.
THOMAS K. ANDERSEN.